March 24, 1942.  F. P. CHAUSSEE  2,277,036
ANTISKID DEVICE
Filed March 10, 1941
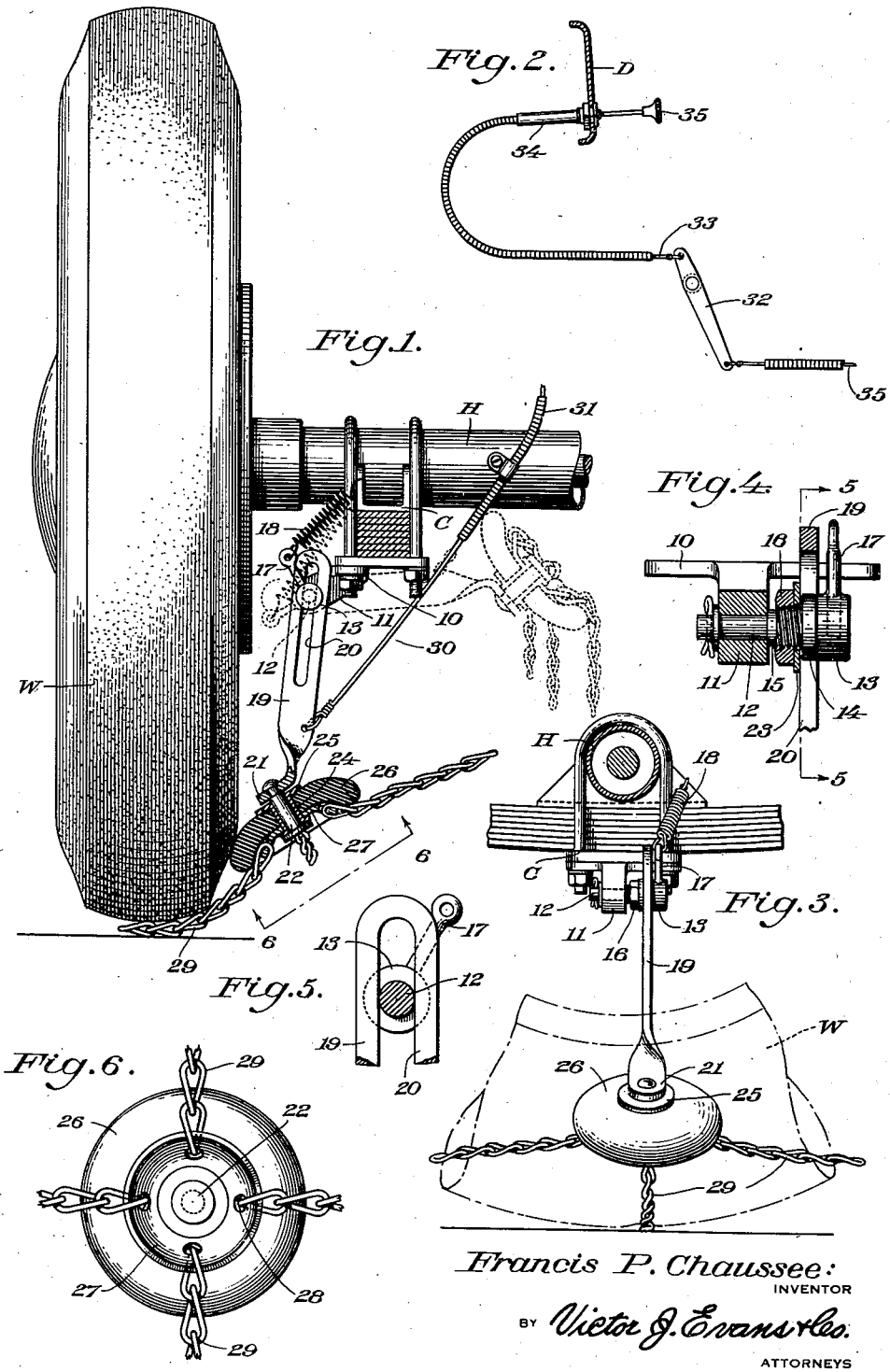
Francis P. Chaussee:
INVENTOR
BY Victor J. Evans & Co.
ATTORNEYS Patented Mar. 24, 1942

2,277,036

UNITED STATES PATENT OFFICE 2,277,036

ANTISKID DEVICE

Francis P. Chaussee, Missoula, Mont.

Application March 10, 1941, Serial No. 382,630

3 Claims. (Cl. 188—4)

The present invention relates to improvements in antiskid devices for motor vehicles and the like.

An object of the invention is to provide an antiskid device adapted to be attached to a vehicle and designed so that it may be readily disposed in operative or in inoperative position.

Another object of the invention is the provision of an antiskid device of the above character which is designed to afford an efficient driving connection with the wheels of a vehicle.

A further object of the invention is to provide an antiskid device of the aforesaid character which is relatively simple and compact in construction and which may be easily attached to a conventional vehicle.

A still further object of the invention is the provision of an antiskid device of the above character which is efficient and reliable in use.

Other objects and advantages of the invention will become apparent as the description progresses.

In the accompanying drawing forming a part of this specification and in which like numerals are employed to designate corresponding parts throughout:

Figure 1 is a front elevational view of the device, partly in section, shown associated with the wheel and axle of a motor vehicle, Figure 2 is a fragmentary side elevational view of the operating mechanism of the vehicle, Figure 3 is a side elevational view of the device, Figure 4 is a fragmentary detail view of the device partly in section, Figure 5 is a transverse sectional view taken on line 5—5 of Figure 4, and Figure 6 is a fragmentary elevational view as viewed from line 6—6 of Figure 1.

Referring in detail to the drawing, wherein for the purpose of illustration is shown a preferred example of the invention, H designates the rear axle housing of an automobile having the axle thereof drivably connected with a rear drive wheel W. To the housing H is connected, in the customary manner, a spring clamping means generally indicated at C.

To the clamping means C is connected a plate 10 formed with a laterally projecting downwardly inclined apertured lug 11 designed to form a bearing for a journal stud 12. On its outwardly projecting end this stud is formed with an enlarged circular shoulder 13 shaped to provide, at opposed sides thereof adjacent the inner end, a pair of flat relatively narrow faces 14. Inwardly of the shoulder portion 13 the stud is formed with a threaded portion 15 adapted to carry a nut 16. Projecting radially from the shoulder 13 and formed with an eye on its outer end is a radial rod 17 having fastened thereto one end of a coiled tension spring 18 disposed so that its opposite end connects with an apertured portion of the spring clamp C.

On the shoulder of the stud 12 is mounted an elongated arm 19 in the form of a flat bar having a longitudinal slot 20 in the inner portion and having the outer portion bent to form a turned and obliquely inclined holder foot 21 to which is rigidly secured one end of a spindle 22, formed at its outer end with an enlarged collar. The slotted portion of the arm 19 is fitted over the stud shoulder so that the side walls of the slot are slidingly disposed against the faces 14, rendering the arm longitudinally adjustable relative to the stud. The arm is firmly fastened in set position on the stud by a washer 23 pressed against the side of the arm by the nut 16.

Rotatably fitted on the spindle 22 is a bearing sleeve 24 having end flanges 25 and secured to the center opening of a drive member 26. This drive member is in the form of a disk of resilient friction material, such as rubber or rubber composition, dished so that the marginal portion projects in curved formation axially from the center portion. To one face of the drive disk is secured a metallic disk 27, also of dished form having circumferentially spaced apertures 28 for connection therewith of a plurality of flexible antiskid elements 29. These latter elements constitute lengths of chain having their inner links passed through the apertures 28 of the fastening disk element as shown to advantage at Figures 1 and 6.

To the outer portion of the arm 19 is connected the outer end of an actuating element 30 which may embody a flexible wire extended through a conduit 31 and having its inner end connected to one extremity of a pivoted lever 32. To the opposite end of the lever 32 is attached one end of an extension wire section 33 passed through a rigid guide tube 34 attached to the instrument or dash board D of the vehicle. An actuating knob 35 is secured on the wire section 33.

To dispose the antiskid device in operative arrangement, the knob 35 is extended, enabling the spring 18 to swing the pivot stud 12 to the position wherein the arm 19 is extended downwardly and the drive disk 27 pressed against the wheel W as clearly illustrated at Figure 1. During movement of the vehicle with the device in this position the frictional contact of the wheel with the disk causes rotation of the latter with the result that the chain sections 28 are swung outwardly to radial positions relative to the axis of the disks 26 and 27 and successively thrown under the tread of the wheel to present an antislip body between the wheel tread and the ground, thereby affording frictional wheel engaging means which will effectively prevent skidding or spinning of the wheel. When conditions are such that antiskid means is not required the vehicle driver depresses the knob 35 and, through the instrumentality of the wire sections 30 and 33 and the lever 32, swings the arm 19 from its depending operative position to an approximately horizontal position, as shown in dotted lines at Figure 1, to dispose the rotary antiskid member in retracted inoperative position.

It will be apparent that the device provides antiskid means of a relatively simple compact nature which may be selectively controlled to assume positions into and out of operative position from a remote control point conveniently accessible to the operator, thus resulting in a minimum of wear of the antiskid elements while enabling use at any time that such a device is necessary or advantageous.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. In an antiskid device for vehicles, a bearing member adapted for connection with the vehicle, a pivot stud rotatably mounted in the bearing member, an arm connected to and rotatable with the said pivot stud, the said arm being longitudinally adjustable on the stud, means for securing the said arm in adjusted position, and spring means adapted for connection with the stud for yieldingly urging the stud and arm to a predetermined operative position.

2. In an antiskid device for vehicles, a bearing member adapted for connection with the vehicle, a pivot stud rotatably mounted in the bearing member, an arm connected to and rotatable with the said pivot stud, the said arm being longitudinally adjustable on the stud, means for securing the said arm in adjusted position, spring means adapted for connection with the stud for yieldingly urging the stud and arm to a predetermined operative position, a rotary nonskid device on the outer end of the arm, and means controllable from a position conveniently accessible to the vehicle driver for moving the antiskid device into and out of operative position.

3. In an antiskid device, a circular drive member of resilient material having a bore through the center thereof, a bearing sleeve extended through the said bore formed with an annular flange at each end, a dished disk of rigid material having a center aperture fitted against the outer face of the drive member and tightly held between the said drive member and the flange of the sleeve, the said disk having circumferentially spaced apertures in the marginl portion thereof, and a plurality of flexible antiskid elements attached to the apertured portion of the said disk.

FRANCIS P. CHAUSSEE.